Feb. 10, 1953 G. J. RECKER 2,627,761
UNLOADING MECHANISM FOR VEHICLE BOXES
Filed July 22, 1947 2 SHEETS—SHEET 1

INVENTOR.
G. J. RECKER
BY
Merrill M. Blackburn

Feb. 10, 1953 G. J. RECKER 2,627,761
UNLOADING MECHANISM FOR VEHICLE BOXES
Filed July 22, 1947 2 SHEETS—SHEET 2
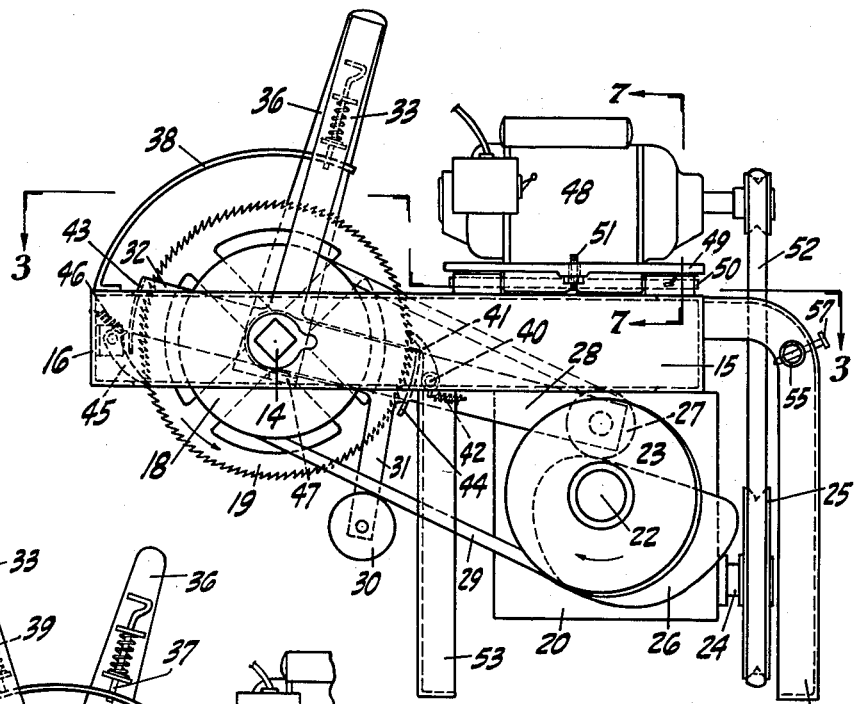
Fig. 4
Fig. 5
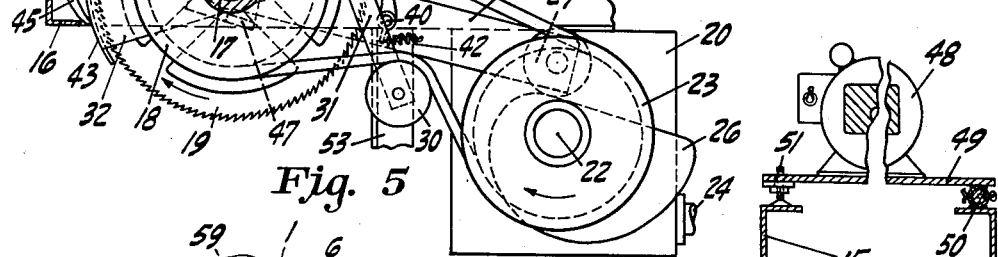
Fig. 7
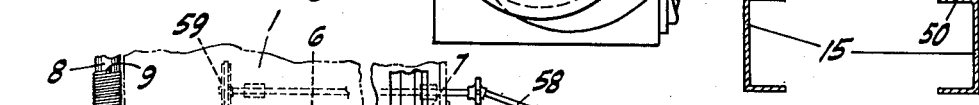
Fig. 6
INVENTOR.
G. J. RECKER
BY
Merrill M. Blackburn Patented Feb. 10, 1953

2,627,761

UNITED STATES PATENT OFFICE 2,627,761

UNLOADING MECHANISM FOR VEHICLE BOXES

Gerald J. Recker, near Hopkinton, Iowa, assignor to Florian B. Recker, Hopkinton, Iowa Application July 22, 1947, Serial No. 762,701

5 Claims. (Cl. 74—664)

My present invention relates to vehicle unloading mechanism and more particularly to mechanism whereby motive power may be utilized in the unloading of vehicle boxes. Among the objects of this invention are the provision of improved mechanical means for the movement of a false endgate in a vehicle box to cause unloading thereof; the provision of a mechanism of the type indicated which can be adjusted to vary the speed of unloading; the provision of an apparatus of the type indicated which is so constructed that it can move the endgate either forwardly or backwardly; the provision of an apparatus of the type indicated which is so constructed that the means for moving the endgate forwardly and backwardly cannot be put into operation simultaneously; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, and a modification thereof, I desire the same to be understood as illustrative only and not to be interpreted in a limiting sense.

In the drawings annexed hereto and forming a part hereof,

Fig. 4 is a side elevation of the structure shown in Fig. 3, with parts in one operating position;

Fig. 5 is a sectional view similar to Fig. 4, with parts in a different operating position, the section being taken along the plane indicated by the line 5—5, Fig. 3;

Fig. 6 is a fragmentary plan view of a modified form of this construction; and

Fig. 7 represents a vertical transverse section, approximately along the plane indicated by the line 7—7, Fig. 4.

Figures 1, 2, 3:
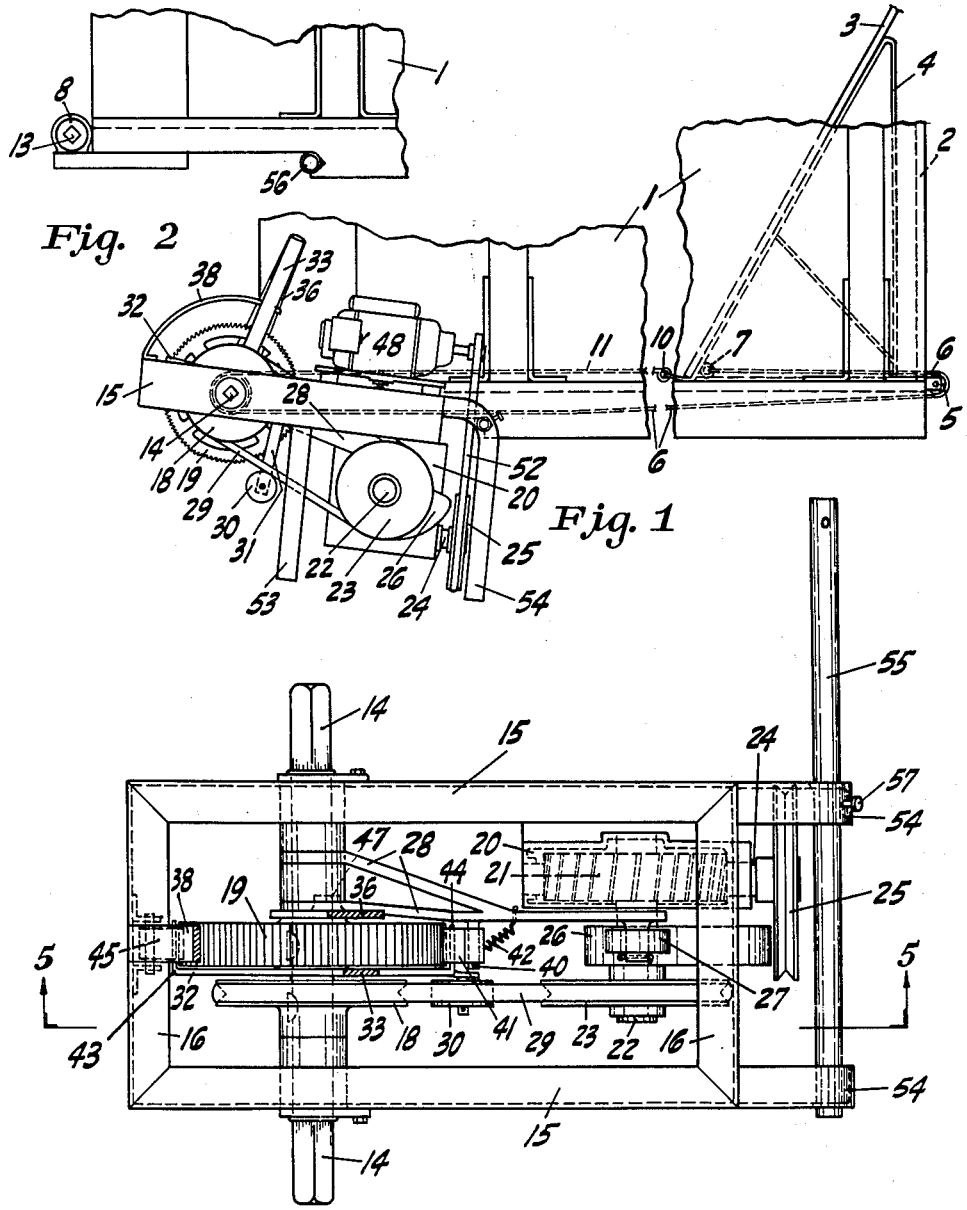
Fig. 1 represents, fragmentarily, a vehicle box with an apparatus embodying my invention applied thereto and shown in side elevation.
Fig. 2 shows, in side elevation, fragmentarily, a small part of the rear bottom corner of a vehicle box with a part of the present apparatus attached thereto.
Fig. 3 shows, on a larger scale, a plan section of the operating mechanism for the endgate, substantially along the plane indicated by the line 3—3, Fig. 4.

Reference will now be made in greater detail to the annexed drawings for a more complete description of this invention. The vehicle box or body 1 customarily has a fixed endgate 2 and, according to my invention, there is provided a movable endgate 3, supported in inclined position by a framework 4. At the forward end of the box is mounted a pulley 5, around which passes a cable 6, one end of which is connected at 7 to the lower edge portion of the inclined endgate 3, which may be referred to as a false endgate. The second end of the cable 6 is connected to a drum 8, as indicated at 9, so that when the drum is turned in one direction, the cable 6 will be wound thereon. This will result in the endgate 3 being moved toward the forward end of the box. Attaching means 10 are connected to the two ends of the endgate 3 and to these are secured cables 11 which pass above the bed of the box 1 and back to the rear end thereof where they are secured to the drum 8 to be wound thereon when it is desired to pull the endgate 3 back for the purpose of unloading the box. This is indicated at 12 in Fig. 6.

As indicated at 13 in Fig. 2, the drum 8 has, in its ends, non-circular openings for the reception of a similarly shaped end of a driving shaft 17, this being shown at 14 in the present drawing as being square to fit in a square opening 13 in the drum 8.

The power transmitting unit is shown as having a rectangular frame fabricated from structural steel channels, the sides of which frame are indicated at 15, and the ends at 16. The shaft 17, having its ends squared, as indicated at 14, passes through the side frame members 15 and is rotatably mounted therein, being provided with any desired bearings. A belt pulley 18 and ratchet 19 are mounted on the shaft 17 and, as indicated in Fig. 3, are keyed thereto so that rotative force transmitted to either 18 or 19 will be transmitted to the shaft 17, from this to the drum 8, and from that to the endgate 3. A gear box 20 is shown as being mounted on the under side of the frame 15, 16, and in this box is a worm gear 21 mounted on and secured to the shaft 22. On the shaft 22 is a belt pulley 23 which is driven by the rotation of the worm gear 21, rotated by rotation of the shaft 24 on which is mounted the belt pulley 25. Also mounted on the shaft 22 is a cam 26 which is engaged peripherally by the roller 27 mounted on the end portion of the arm 28. It will be seen from this, that as the shaft 22 rotates, the cam 26 will cause the lifting of the arm 28, for a purpose to be described presently.

A V-belt 29 passes over and connects the pulleys 18 and 23 in driving relation, when the belt is tightened up by the idler pulley 30 on the arm 31. The arm 31 is part of the cross-arm 32 and projects laterally therefrom, as shown most clearly in Figs. 4 and 5. A lever 33 is connected to and forms a part of the cross-arm 32 and, when pulled rearwardly, raises the idler 30, causing the belt 29 to be tightened so that the pulleys 18 and 23 are connected in driving relation. When the belt 29 is not tight, then it may slip with relation to one or both of the pulleys 18 and 23. When the pulley 30 does not tighten the belt 29, the pawls may engage the ratchet to cause rotation thereof.

The arm 28 is loosely mounted on the shaft 17 and may oscillate thereabout when the cam 26 engages the roller 27 and causes the raising thereof. The weight of this is, incidentally, sufficient to cause the arm 28 to lower so that the roller 27 will be held in contact with the cam 26. A lever 36, provided with latching means 37, is loosely mounted on the shaft 17 and may be adjusted to various positions and held in such adjusted positions by the latching means 37. This latching means cooperates with an arcuate holding member 38 to retain the lever 36 in adjusted positions. A latching means 39 on the lever 33 engages with an opening in the holding member 38 to hold the lever 33 in its extreme forward position, as shown in Fig. 1. This holds the roller 30 out of engagement with the belt 29, or substantially so.

A pivot member 40 projects laterally from the arm 28 and carries a pawl 41 which is spring-actuated into engagement with the ratchet 19 by a spring 42. Guides 43 and 44 are mounted on or constitute a part of the cross-arm 32 and extend over the face of ratchet 19 so that they may, when appropriately adjusted, keep the pawls 41 and 45 out of engagement with the ratchet 19. As shown in Fig. 5, the pawl 45 is mounted on a frame member 16 and is actuated into ratchet-engaging position by the spring 46. In this figure, the guards 43 and 44 are shown in position to keep the pawls 41 and 45 out of engagement with the ratchet. This is during the time that the belt 29 is tightened up and driving the drum 8 in a direction to cause the endgate 3 to approach the forward portion of the box 1. When the lever 33 is moved to the free end of the arcuate member 38, the latching means 39 drops into an opening in the member 38 and holds the lever in the position shown in Fig. 4 with the pulley 30 substantially out of engagement with the belt. In this position, the pawls 41 and 45 are free of control by the guides 43 and 44 and they may engage the notches in the ratchet 19. The pawl holds the ratchet against retrograde movement while the roller 27 follows the flat part of the cam 26.

The lever 36 is provided at its lower end with a lug 47 which projects laterally under the arm 28 and serves to raise this arm somewhat as the lever is moved away from the position shown in Fig. 5. When the lever 28 is held up by the lug 47, the roller 27 contacts the edge of the cam 26 only through part of the rotation of said cam. Therefore, the pawl 41 will be held out of engagement with the ratchet 19 during a part of the stroke of the lever 28. This, then, predetermines the amount by which the ratchet 19 will be advanced, also, the amount by which the endgate will be moved toward the rear of the box.

A motor 48 is shown as provided with a base 49 hingedly connected at 50 to one of the members 15. At its opposite edge, it is provided with an adjusting screw 51 by means of which the plate or base 49 can be turned about its pivot 50 to tighten the belt 52 through which the motor drives the pulley 25, shaft 24, and the parts driven thereby. Legs 53 and 54, connected to the frame members 16, serve to support the power transmission mechanism above the ground or other support upon which it may be placed when removed from its operative position on the vehicle.

The legs 54 are provided with holes through which a pipe 55 extends for insertion into a socket 56 attached to the truck frame. If it is desired to remove this power transmission unit from one side of the vehicle to the other, the securing means 57 may be withdrawn and the support 55 pushed through the legs 54 so that it projects from the opposite side of the power unit. The socket 56, at the opposite side of the truck, will receive the projecting end of the support 55, and the square shank 14 of the shaft 17 will then be inserted into the socket 13 at the opposite end of the drum.

It is obvious that the motor 48 is removable with the rest of the structure described. However, if one does not have the motor 48, the vehicle may be provided with a drive shaft 58 which may be connected with the power take-off of the tractor unit, and this shaft will have at its rearward end a belt pulley 59 which will be connected by a belt 60 to the pulley 25, as shown in Fig. 6, and then the operation will be the same as that described above. It will be understood that there is a worm on the shaft 24 which meshes with the worm gear 21 in the casing 20.

The operation of this mechanism will next be described briefly, and for this purpose we will assume that the false endgate 3 has been moved to the forward end of the vehicle body, as shown in Fig. 1, and that a load has been put into the box rearwardly from the endgate. It will also be assumed that it is desired to unload the load at a fairly rapid rate. Therefore, the levers 33 and 36 will be put in the positions shown in Figs. 1 and 4. The latching means 37 and 39, extending through holes in the guides 38, hold the levers 33 and 36 in adjusted position. The switch of motor 48 is now closed and the motor causes the shaft 24 to rotate, and this, in turn, causes rotation of the shaft 22, pulley 23, and cam 26. Rotation of this cam causes the roller 27 and arm 28 to be lifted, and this raises the pawl 41 which, engaging in a notch of the ratchet 19, will cause same to be turned. Since the ratchet 19 and shaft 17 are connected in operative relation, rotation of the ratchet will cause rotation of the shaft, and this will cause rotation of the drum 8, thereby winding the cables 11 on the drum 8 and pulling the endgate 3 toward the rear of the box. Engagement of the pawl 45 with the ratchet 19 will prevent reverse motion of the latter, which is again stepped forward each time the cam 26 raises the arm 28. If it is desired to advance the endgate less rapidly, then the lever 36 is moved back so that the latch 37 engages in a different hole in the guard 38. Advancing the lever 33 moves the shield or guide forwardly so as to shorten the effective length of the stroke of pawl 41, thus reducing the amount which the ratchet 19 may be rotated and decreasing the rate of advance of the endgate.

If it is desired to return the endgate to the forward end of the box, the lever 33 is pulled rearwardly to cause the guides or shields 43 and 44 to hold the pawls 41 and 45 out of engagement with the ratchet 19. This will also cause the pulley 30 to tighten the belt 29 with the result that the direction of rotation of ratchet 19 and drum 8 is reversed. This reverses the direction of travel of the endgate.

It is of course understood that the specific description of structure set forth above may be departed from without departing from the spirit of this invention as disclosed in this specification and as defined in the appended claims.

Having now described my invention, I claim:

1. Operating means comprising a framework, a shaft extending transversely therethrough for mounting the framework on a vehicle, a gear housing in the framework, gearing in the housing, a shaft extending outwardly from the housing, a cam on said shaft, a roller engaging the cam surface of the cam, a second shaft extending outwardly from the framework, a ratchet carried by the second shaft, a pawl carried by said framework and engaging said ratchet, an arm pivotally mounted on said second shaft and carrying said roller, a pawl carried by said arm and engaging said ratchet, said cam causing oscillation of said arm and the pawl carried by the arm, said pawl causing rotation of said ratchet, belt pulleys carried by said shafts, in alignment, a belt connecting said pulleys, a cross-arm carried by said second shaft, a belt-tightener carried by said cross-arm, means carried by said cross-arm and holding said pawls out of engagement with the ratchet when the belt-tightener is operated to tighten the belt, and means serving to allow the pawls to engage the ratchet and rotate the same when the belt-tightener is not actuated into tightening position.

2. A structure as defined by claim 1 in which a lever is loosely mounted on said shaft and extends beyond the shaft in opposite directions, and a lug on a projecting end of said lever, the lug engaging under the cross-arm to lift the same as the lever is moved backwardly, whereby to raise the roller a larger or smaller amount and control the number of notches the pawl will move the ratchet forward.

3. A shaft rotatable in opposite directions, a ratchet and a pulley connected to said shaft in driving relation, a lever pivotally mounted on said shaft and carrying a pawl for cooperation with said ratchet, a second shaft parallel with the first shaft and having a cam thereon for cooperation with said lever, a pulley on the second shaft in planar alignment with the first mentioned pulley, a belt on said pulleys for driving one from the other when the belt is tightened, the cam causing oscillation of the lever about the first shaft as the cam rotates, lifting means cooperating with the lever to regulate the amount of oscillation of the lever about the shaft upon which it is mounted, means for tightening the belt and for preventing engagement of the pawl with the ratchet, and a manually operated lever pivotally mounted on the first shaft and carrying the lifting means to limit the amount by which the first mentioned lever may be depressed when following the cam.

4. In a drive mechanism, a frame, a shaft extending through said frame, an arm pivotally mounted on said shaft to be oscillated by a cam, a wheel mounted on said arm to provide an antifriction contact between said arm and said cam, a housing mounted in said frame, a gearing in said housing for driving said cam, a second shaft forming part of said gearing, said cam being mounted on said second shaft and rotated thereby as said second shaft is rotated, a belt pulley mounted on said second shaft, the wheel mounted on said arm being oscillated by said cam, a ratchet mounted on said first shaft for driving said shaft, a pawl supported on said frame and engaging said ratchet for preventing retrograde motion of the ratchet when the ratchet is engaged by the pawl, a second pawl pivoted on said arm and engaging said ratchet for driving said ratchet, a belt pulley mounted on said first shaft, a belt connecting said pulley on said first shaft and the belt pulley mounted on said second shaft, a second arm pivotally mounted on said first shaft, and a belt tightener carried by said second arm and capable of tightening said belt, the second arm, when oscillated, causing the belt to be tightened and driven by rotation of said second shaft and causing the pawls to be removed from engagement with the ratchet.

5. A drive mechanism comprising the combination of a frame, a shaft extending on both sides of the frame, a ratchet on said shaft and secured thereto, a pawl secured to the frame and engaging the ratchet to prevent retrograde motion thereof when the ratchet is driven as a ratchet, an arm pivoted to said shaft and having a pawl pivotally carried by the arm in engagement with the ratchet, a wheel carried by the end of the arm, a second arm pivotally carried by the first shaft and having a pair of guards extending over the edge of the ratchet and serving as means for holding said pawls away from the ratchet when the second arm is turned about the first shaft, a belt pulley secured to the first shaft, a worm gearing secured in said frame, said gearing having a second shaft parallel with the first shaft, a drive for the worm gearing, a cam mounted on the second shaft and engaged by the wheel, the cam and wheel causing the first arm to oscillate, the second shaft having a second belt pulley mounted thereon, and a belt around the pulleys and driving the first shaft from the second shaft, when the guards holding the pawls away from the ratchet when the second arm is so turned about the first shaft causes tightening of the belt.

GERALD J. RECKER.

REFERENCES CITED

The following references are of record in the file of this patent:

UNITED STATES PATENTS

| Number | Name | Date |
|---|---|---|
| 151,256 | Walker | May 26, 1874 |
| 257,098 | Snyder | Apr. 25, 1882 |
| 749,334 | Siebenhaar | Jan. 12, 1904 |
| 855,039 | Baron | May 28, 1907 |
| 1,138,970 | Pierce | May 11, 1915 |
| 1,251,372 | Hewitt | Dec. 25, 1917 |
| 1,834,822 | Boling | Dec. 1, 1931 |
| 1,946,807 | Neighbor | Feb. 13, 1934 |
| 2,298,982 | Smith | Oct. 13, 1942 |
| 2,340,983 | Pfeiffer et al. | Feb. 8, 1944 |
| 2,434,718 | Recker | Jan. 20, 1948 |
| 2,448,122 | Recker | Aug. 31, 1948 |
| 2,448,737 | Reisenweber | Sept. 7, 1948 |
| 2,463,643 | Recker | Mar. 8, 1949 |